INVENTOR.

HAROLD R. GREENE

United States Patent Office 3,543,139
Patented Nov. 24, 1970

3,543,139
MULTIPLE REGULATED OUTPUTS IN A SINGLE PULSE REGULATOR
Harold R. Greene, New Shrewsbury, N.J., assignor to Electronic Associates Inc., Long Branch, N.J., a corporation of New Jersey
Filed Aug. 21, 1968, Ser. No. 754,266
Int. Cl. G05f 1/56
U.S. Cl. 323—22  3 Claims

ABSTRACT OF THE DISCLOSURE

A regulating circuit for a power supply which supplies regulated power to a multiplicity of load devices. The regulating circuit operates by controlling the time of application of an unregulated source to each load as a function of the difference between a preset reference level and the voltage output at the load. The length of time of application of unregulated power is directly proportional to the magnitude of the difference signal. An astable multivibrator enables application of unregulated power and thereby determines the maximum length of time available for application of power from the unregulated source.

---

Figure 1:
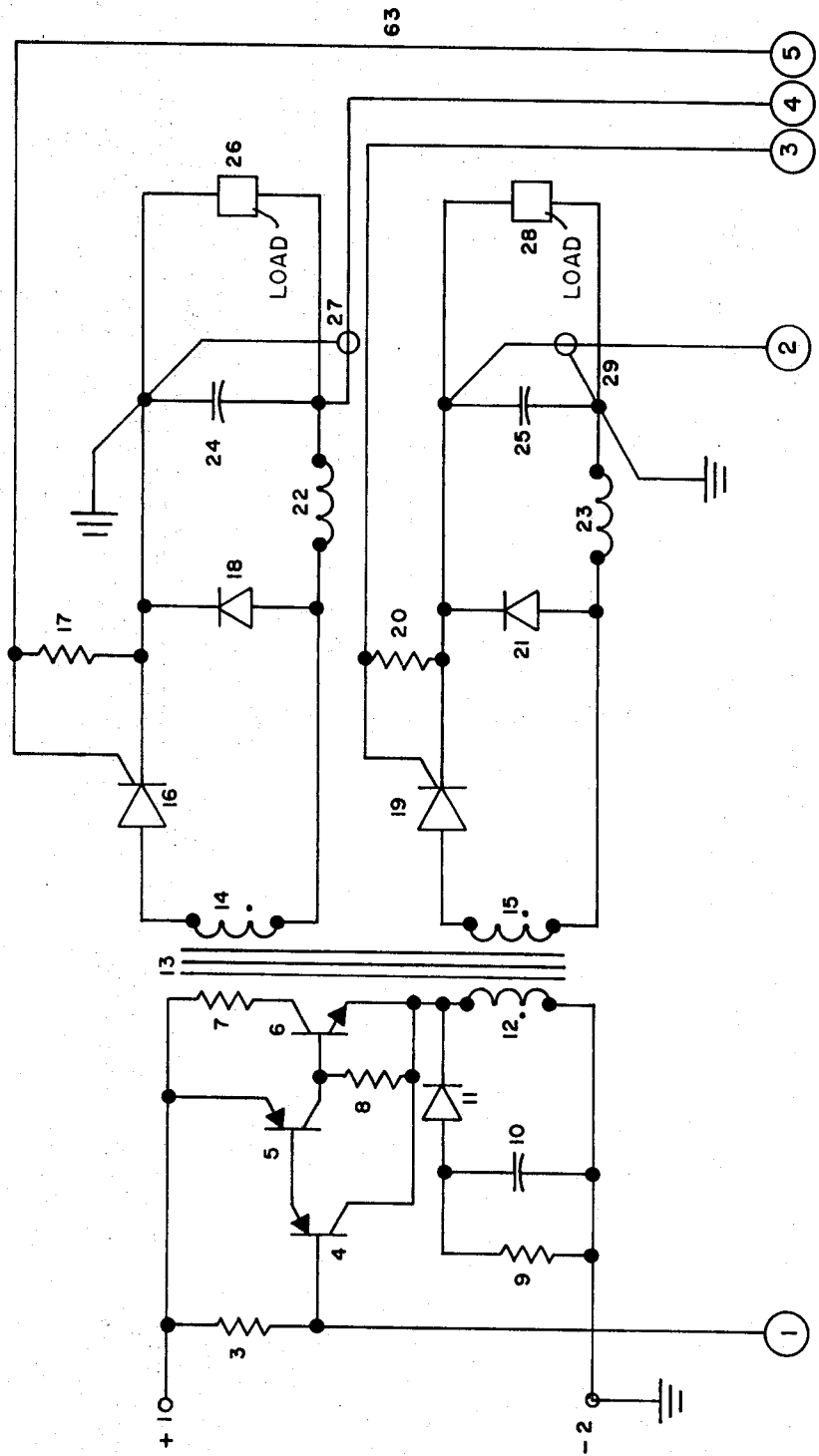

This invention relates to regulated power supplies and, more particularly, to obtaining a plurality of independent regulated outputs from a single unregulated voltage source.

Prior art voltage regulators are characterized by the use of several separate power supplies and several complete regulating networks. These regulator networks consist of a control element connected either in series or in shunt with the load. The shunt regulator, which must withstand the full output voltage under normal operating conditions is less efficient for most applications and is thus less often utilized than the series regulator.

The use of series or shunt regulators create problems when it is desired to regulate plural outputs from a single unregulated source.

One method for accomplishing such regulation involves the use of independent power supplies and regulating networks for each output. This solution is unsatisfactory as it involves great cost in duplication of components. Thus, it has been a long-standing goal in the art to provide as much sharing of circuit components as possible to reduce cost and complexity.

Efficient sharing when using series regulators is limited to those situations where the magnitude of each output voltage is very close to the input voltage. This occurs because the power dissipated in a series regulator is equal to the load current multiplied by the difference between the unregulated input voltage and the output voltage. As the voltage difference increases, more power is dissipated in the series regulator resulting in decreased efficiency.

Methods exist for minimizing this reduction in efficiency as by changing the input voltage with change in output voltage to maintain a constant difference. This results in increased cost and complexity in the regulator.

A further development in the art is the pulse width regulator. Energy is inductively coupled to the load during the interval of conduction of a switching transistor. Regulation of the output voltage is effected by varying the "ON" time of the switching transistor.

The present invention provides a pulse width regulator in which the "ON" time of the switching transistor is constant with the energy being coupled to the load for a shorter period. This shorter period is individually variable for each load.

In brief, the shorter period is established by delaying the firing time of a silicon controlled rectifier with respect to the "ON" time of a switching transistor. This delay is developed by enabling a logical gate circuit during the "ON" time of the switching transistor, and initiating conduction of the silicon controlled rectifier during this enabled period for a time dependent upon the degree of deviation of the load voltage from a reference voltage source.

This circuit has the advantage of much sharing of components while permitting precise regulation of outputs of widely differing magnitudes.

It is an object of the present invention to provide sharing of circuit components in a regulated power supply.

A further object of the invention is the provision of a regulating circuit whereby plural outputs of differing magnitudes can be controlled from a single unregulated source.

Figure 2:
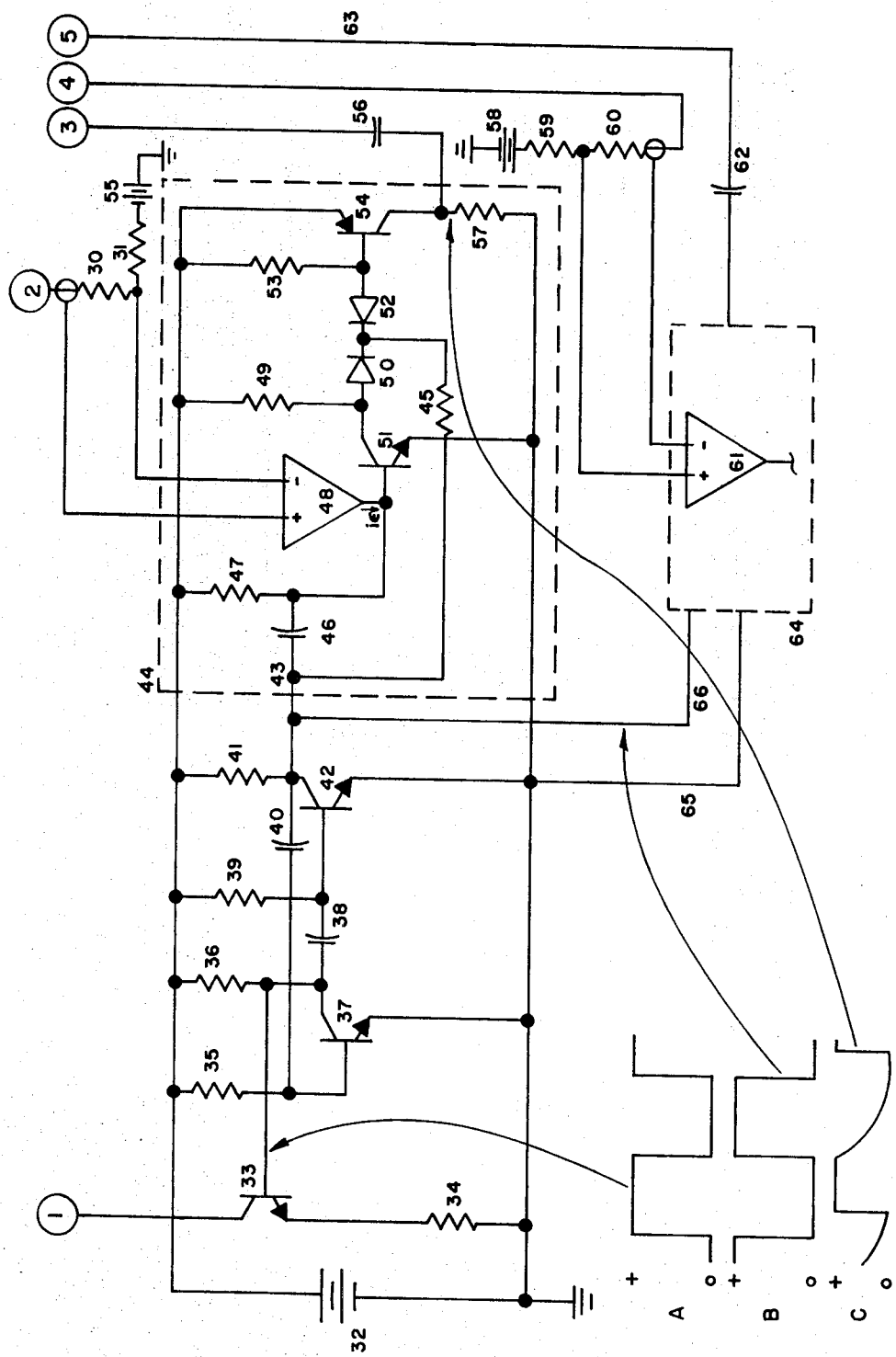

These as well as other objects will become apparent from a reading of the following specification and drawings in which:

FIGS. 1–2 taken together constitute a schematic diagram of the principal embodiment of the invention.

In the drawings the circled numerals in FIGS. 1–2 indicate corresponding connections between the two figures.

In FIG. 1, unregulated voltage from a voltage source, not shown, is applied to terminals 1 and 2 and thereby, across the collector and emitter of a switching transistor 6. More particularly, the collector of transistor 6 is coupled to terminal 1 via a voltage and current limiting resistor 7. Resistor 7 dissipates power which would otherwise have to be absorbed by transistor 6 during the period transistor 6 is conducting. The emitter of transistor 6 is connected to one side of primary winding 12 of a transformer 13 and thence to grounded terminal 2.

Transistors 4 and 5 constitute a portion of the control circuitry for switching transistor 6. More particularly, terminal 1 is connected to the base of transistor 4 via a bias resistor 3. Resistor 3 serves to prevent transistor 4 from conducting until a signal from circuitry to be described later causes transistor 33 to conduct. The emitter of transistor 4 is directly coupled to the base of transistor 5. Transistor 5 has its emitter connected to terminal 1, and its collector coupled to the base of switching transistor 6. Resistor 8 is coupled between the base and emitter of transistor 6 and provides a base-emitter bias return preventing transistor 6 from conducting unless transistor 5 is conducting and ensures rapid return to the non-conducting state when transistor 5 becomes non-conducting.

When transistor 6 is conducting, the magazine current in primary winding 12 increases. When transistor 6 becomes non-conducting, some means must be provided to dissipate the energy stored in the mutual inductance of transformer 13 and the primary leakage inductance of primary winding 12. This dissipation is accomplished by a power diode 11 whose cathode is coupled to the ungrounded side of primary winding 12 and whose anode is connected to the juncture of resistor 9 and capacitor 10. When switching transistor 6 conducts, the polarity of the voltage across winding 12 is such that diode 11 blocks current flow to capacitor 10. When transistor 6 becomes non-conducting, this polarity reverses, and diode 11 conducts causing the charging of capacitor 10. Capacitor 10 is continuously discharged through resistor 9.

Control for the switching of transistor 6 is developed by the output of an astable multivibrator circuit connected to the base of transistor 4 via the base and collector of transistor 33, FIG. 2. Current limiting for transistor 33 is provided by resistor 34. Transistor 33 amplifies the output of a conventional astable multivibrator comprising transistors 37 and 42, resistors 35–36, 39 and 41, and capacitors 38 and 40. Bias supply for the multivibrator is provided by a voltage source 32. The output of the multivibrator at the collector of transistor 37 (wave form A) is amplified by transistors 33, 4 and 5 and applied to the base of transistor 6 to switch it into conductivity.

The complementary output of the astable multivibrator (wave form B) is fed from the collector of transistor 42 to regulating circuitry shown generally at 44. More particularly, the complementary output is fed to the juncture of one plate of capacitor 46 and resistor 45 denoted by the reference numeral 43. The other plate of capacitor 46 is directly connected to the base of transistor 51. Bias for transistor 51 is provided by resistor 47.

Transistor 51 also has applied thereto, the output of a differential amplifier 48. The collector of transistor 51 is connected to the anode of diode 50. Resistor 49 serves as a load resistor for transistor 51. The cathode of diode 50 is connected to the cathode of another diode 52. Resistor 45 is connected between this common cathode connection and point 43. The combination of diodes 50, 52 and resistor 45 constitutes a logic gate whose output at the anode of diode 52 is coupled to the base of a transistor 54. The gate causes transistor 54 to conduct only when point 43 (wave form B) is at 0 volts and transistor 51 is conducting. Bias for transistor 54 is provided by resistor 53. Resistor 57 is the load resistor for transistor 54.

The output of the regulating circuit 44 is connected from the collector of transistor 54 via a capacitor 56 to the gate of a silicon controlled rectifier (SCR) 19, FIG. 1.

The values of resistor 57 and capacitor 56 are chosen to develop a time constant such that SCR 19 is incapable of being triggered during the time switching transistor 6 is non-conducting. Wave form C illustrates a typical output of this R.C. combination.

The anode of SCR 19 is connected to one side of secondary winding 15. The cathode of SCR 19 is connected to the cathode of diode 21. Diode 21, capacitor 25, and load 28 are all connected across the secondary winding 15. An inductor 23 is coupled between the anode of diode 21 and ground. Resistor 20 is a bias resistor for SCR 19 to prevent the SCR from firing unless a triggering signal is applied thereto.

As shown in FIGS. 1 and 2, the non-inverting input of differential amplifier 48 is grounded via the shield of a coaxial cable 29. The inverting input is connected to a voltage divider consisting of resistors 30, 31 and voltage source 55.

Load 26 has similar regulating circuitry connected thereto. More particularly, the output of a regulating network 64 is applied via capacitor 62, and lead 63 to the gate of an SCR 16. Network 64 has a differential amplifier 61 connected to a voltage divider comprised of resistors 59, 60 and a voltage source 58. One input of amplifier 61 is connected to the grounded shield of a coaxial cable 27. The other input is connected to the output of the voltage divider.

Lead 65 provides a common ground connection for regulating networks 44 and 64 while lead 66 couples the complementary output of the astable multivibrator to the regulating network 64.

It will be apparent that network 64 contains the same structure as shown in regulating network 44. In addition, it will be seen that the load control circuitry for load 26 comprising elements 14, 16–18, 22 and 24 is the same as that for load 28 with the exception of a polarity reversal caused by grounding opposite sides of capacitors 24 and 25 respectively.

The circuit operates as follows: unregulated line voltage is applied to switching transistor 6 via input terminals 1 and 2. The switching time of transistor 6 is controlled by the standard astable multivibrator circuit consisting of transistors 37 and 42; resistors 35, 36, 39 and 41; and capacitors 38 and 40. The output of the astable multivibrator at the collector of transistor 37 is amplified by transistors 33, 4 and 5.

In the principal embodiment, switching transistor 6 is on and off for equal periods of time. During the ON time of transistor 6, a voltage is induced in secondary windings 14 and 15 of transformer 13 via the primary winding 12.

Regulation of the voltage output to loads such as 26 and 28 is obtained by delaying the turn-ON time or triggering of silicon controlled rectifiers 16 and 19 with respect to the start of the ON time of switching transistor 6. When transistor 6 turns off, the voltage induced in secondary windings 14 and 15 reverses polarity and turns off the silicon controlled rectifiers. Thus, the ON time of the silicon controlled rectifiers is always less than the ON time of switching transistor 6.

The firing time (start of the ON time) of the silicon controlled rectifiers is established by the electronic circuitry in regulating networks 44 and 64. More particularly, in network 44, the error current output of differential amplifier 48 is a function of the output voltage amplitude to load 28 (V28) and the output of a voltage divider consisting of resistors 30 and 31 and a voltage source 55. Voltage source 55 is a stable reference source which, in the principal embodiment, has a value of —6 volts. If V28 decreases, the error current output of amplifier 48, $i_e$ increases.

When switching transistor 6 is turned ON by the positive output of the astable multivibrator, the complementary output from the collector of transistor 42 is coupled to the base of transistor 51 via point 43 and capacitor 46. Point 43 is thus at zero volts, rendering transistor 51 non-conducting and preventing transistor 54 from turning ON. After a time delay dependent upon: (1) the magnitude of the error current output of amplifier 48, and (2) the time required for said error current to chage capacitor 46, transistor 51 is rendered conducting. When point 43 is at zero volts, the logical gate comprised of diodes 50, 52 and resistor 45 is enabled. Conduction of transistor 51 during this enabled period turns on transistor 54. When transistor 54 conducts, capacitor 56 discharges causing silicon controlled rectifier 19 to fire.

The magnitude of the error current output of amplifier 48 is dependent upon the magnitude of the difference between the voltage across load 28 (V28) and the output of the voltage divider $$\frac{R30}{R31}(V55)$$

The greater the difference, the larger the error current; therefore, the shorter the delay before transistor 51 turns ON which, in turn, increases the ON time of silicon controlled rectifier 19. This action tends to keep $$V28 = \frac{R30}{R31}(V55)$$

Diodes 18 and 21 provide a current path for inductors 22 and 23 whenever silicon controlled rectifiers 16 and 19 are non-conducting. This permits current to flow continuously from inductors 22 and 23 to capacitors 24 and 25 maintaining low ripple voltage and low RMS ripple current.

Now that the principal embodiment of my invention has been described, it will be apparent that modifications may be made thereto without departing from the spirit and scope thereof. Thus, the scope of the invention is to be determined by the appended claims.

I claim:

1. A regulating circuit for a power supply comprising: a source of unregulated voltage, input means connected to said source, output means whose voltage is to be regulated, inductive coupling means connected to said source and to said output means, first switch means connected between said source and said inductive coupling means, second switch means connected between said output means and said inductive coupling means, a reference voltage source, and control means connected to said first and second switch means, said output means and said reference source to: (1) control said first switch means at a constant periodic rate, and (2) control said second switch means at a variable rate dependent upon said periodic rate and the difference between the voltage across said output means and said reference voltage source.

2. A circuit for providing energy to a plurality of load devices comprising: a source of unregulated energy, coupling means, first switch means connected between said source and said coupling means for periodically applying said unregulated energy to said coupling means at a fixed rate, and a plurality of second switch means connected between said coupling means and respective ones of said load devices for varying the time of application of said unregulated energy to said load devices in dependence upon the difference between the energies applied to respective ones of said load devices and respective predetermined reference levels.

3. A regulating circuit for a power supply whereby regulated power is supplied to a plurality of output means from a single unregulated source comprising: a source of unregulated voltage, a plurality of output means whose voltage is to be regulated, coupling means connected between said source and each of said output means, first switch means connected between said source and said coupling means, a plurality of second switch means, one for each of said output means connected between said output means and said coupling means, a control circuit for producing first and second output signals, said first output signal being connected to said first switch means, a control network for each of said output means including a source of reference potential, means in each of said networks connected to said reference source and to its respective output means for generating an error signal in proportion to the difference between said reference voltage and the voltage at said output means, and gating means in each of said networks having inputs connected to said error signal producing means and said second output signal for controlling said second switch means as a function of the magnitude of said error signal when said error signal and said second output signal are at predetermined state, thereby controlling the time of application of said unregulated voltage to each of said output means.

References Cited

UNITED STATES PATENTS

| | | | |
|---|---|---|---|
| 3,153,728 | 10/1964 | Proctor | 307—31 |
| 3,258,613 | 6/1966 | Felcheck et al. | |
| 3,309,599 | 3/1967 | Broomhall | 321—18 X |
| 3,334,241 | 8/1967 | Ussery | 321—18 X |
| 3,457,430 | 7/1969 | Samuelson | 307—34 X |

J D MILLER, Primary Examiner

A. D. PELLINEN, Assistant Examiner

U.S. Cl. X.R.

307—34, 38; 323—25, 38